United States Patent [19]

Riha

[11] Patent Number: 4,854,087
[45] Date of Patent: Aug. 8, 1989

[54] GRINDING DISC

[75] Inventor: Werner Riha, Passau, Fed. Rep. of Germany

[73] Assignee: Zahnradfabrik Friedrichshafen AG, Fed. Rep. of Germany

[21] Appl. No.: 157,861

[22] Filed: Feb. 19, 1988

[30] Foreign Application Priority Data

Feb. 28, 1987 [DE] Fed. Rep. of Germany ....... 3706511

[51] Int. Cl.$^4$ .............................................. B24D 7/10
[52] U.S. Cl. .................................. 51/209 R; 51/267; 51/272
[58] Field of Search ...................... 51/209 R, 266, 267, 51/322, 165 B, 109 R, 272, 268, 356, 129, 102, 109 BS

[56] References Cited

U.S. PATENT DOCUMENTS

| 1,600,054 | 9/1926 | MacLaughlin et al. | 51/209 R |
| 3,290,834 | 12/1966 | Lindbland | 51/209 R |
| 4,209,950 | 7/1980 | Sielemann | 51/209 R |

Primary Examiner—Frederick R. Schmidt
Assistant Examiner—Maurina Rachuba
Attorney, Agent, or Firm—Davis, Bujold & Streck

[57] ABSTRACT

A grinding disc having a supporting body (3) the disc's border (5) of which is coated with an abrasive such as cubic boron nitride. The abrasive-covered surface (6) is interrupted by cooling oil grooves (7). The grinding disc is surrounded by a covering hood (11) that forms, with the supporting body (3) a cavity for oil (8) and has on the disc's border an opening providing an access to a working area (12). In the supporting body (3) there are bores (9) that connects an oil supply system with the cooling oil grooves (7).

7 Claims, 2 Drawing Sheets

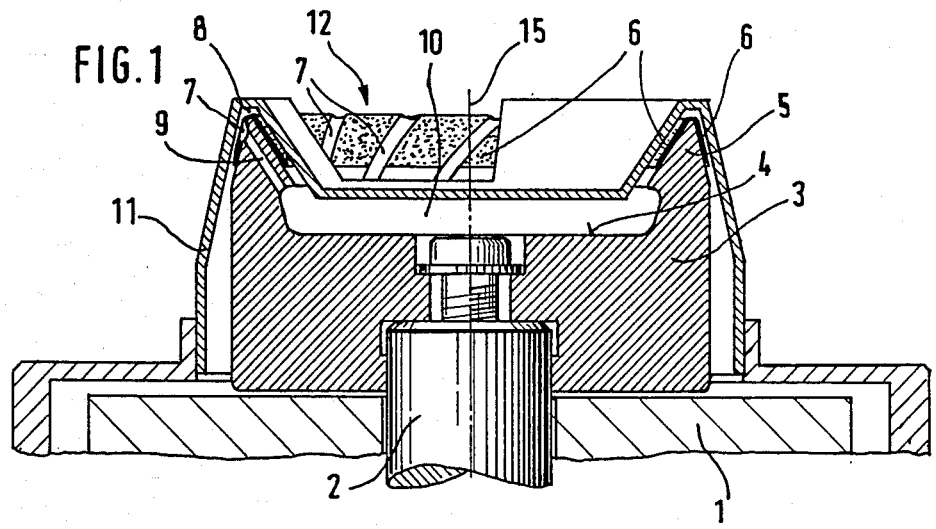
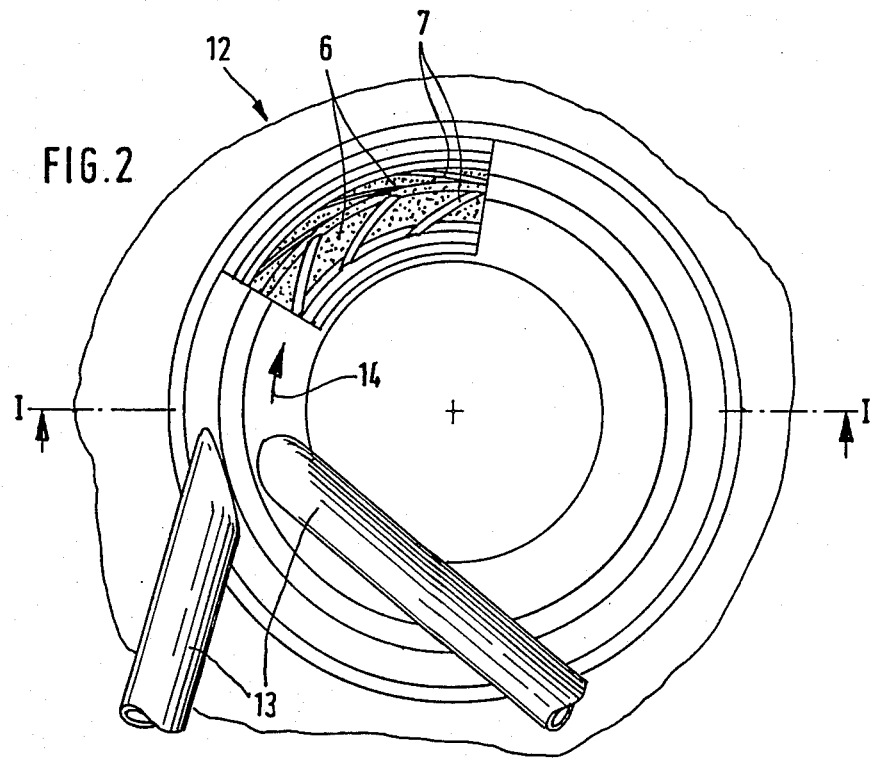

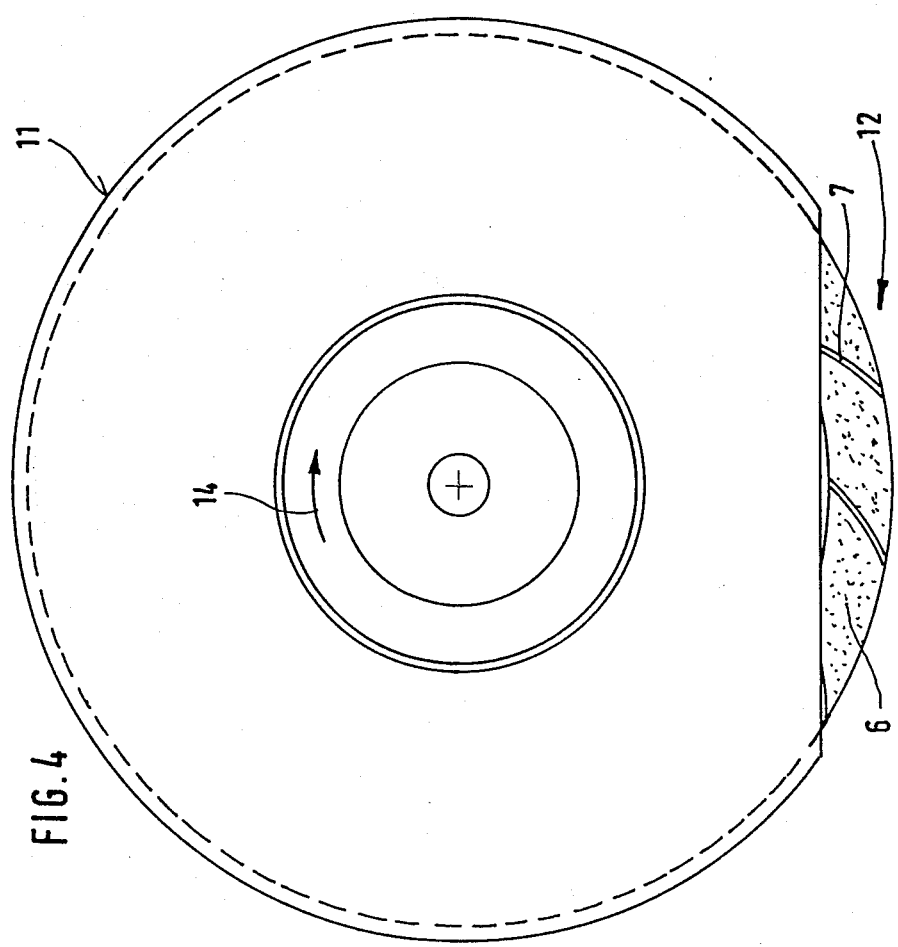
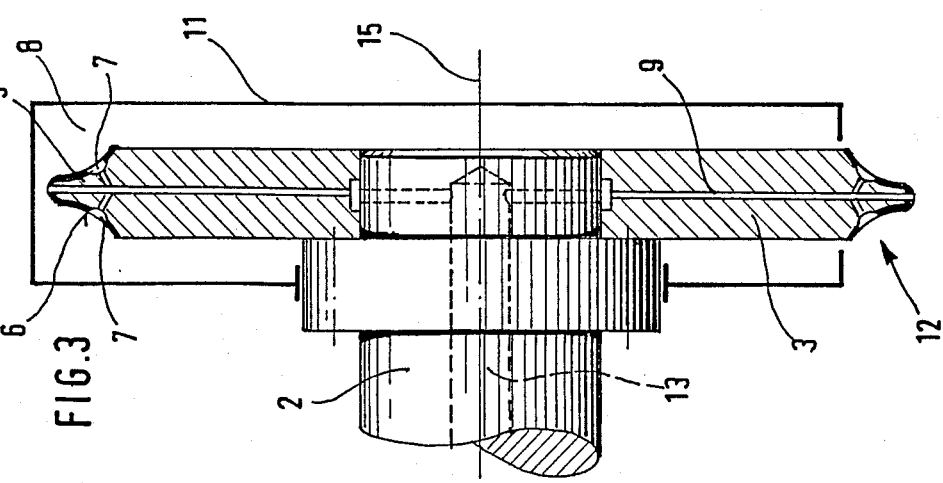

GRINDING DISC

The invention relates to a grinding disc. High grinding efficiencies, which are achieved mainly by the use of coatings with cubic boron nitride because of its relatively low abrasive wear, have as a consequence, as a result of the elevated dynamic stress, that there occurs a great accumulation of heat with the associated danger of high temperatures in the working area of the grinding disc. When grinding materials which are difficult to machine and which have low heat conductivity, such as titanium alloys, ceramic materials and cemented carbide or materials sensitive to overheating, such as tool, case-hardening and heat-treatable steels, numerous defects can appear in the boundary layer, chiefly burning, microcracks, structural changes and high internal tensions. Said defects must be prevented.

It is known (Workshop 116, page 681, Kacalak, Plinchita: grindings discs) to improve the grinding result by convenient profiling and geometric shaping of the surface of the grinding disc. By regularly arranged depressions or grooves in the surfaces of the grinding disc, the surface available for grinding is reduced on the grinding disc by the sum of the surfaces of the depressions or grooves and therewith is reduced, per revolution, the dynamic stress of the grinding disc. Cooling fluid in said depressions or grooves transfers the heat resulting from the dynamic stress from the direct grinding area and reduces local temperature peaks.

The invention is based on the problem of increasing the grinding efficiency of a grinding disc of the above-described kind and improving the quality of the boundary areas of the ground surfaces.

According to the invention this problem is solved by a covering hood that surrounds the whole grinding disc except for a working segment in the area of the grinding surfaces, and that there extend in the grinding disc bores that connect to cooling oil grooves, and that cooling oil is fed to the bores, and the bores are disposed from the rotation axis to the periphery of the grinding disc.

It is known (DE-AS No. 11 23 227) to prevent inadmissible heating of the workpiece by means of coolant or lubricant supply nozzles disposed opposite to each other and having orifices that reach as close as possible to the grinding site. The supply nozzles for the coolant and lubricant are here situated in a housing that encloses the grinding disc on all sides except for a segment in order to make it possible to bring the workpiece to the grinding disc. In this nozzle arrangement, the emergent cooling lubricant is in no position to penetrate the air envelope that rotates with the grinding disc and thus only very little cooling lubricant reaches the specific grinding site.

The present invention improves said arrangement and achieves as a result of an improved cooling of the grinding disc an increased grinding efficiency.

Since the supporting body forms with the covering hood, a hold-back room for oil and from an oil supply system in the interior of the supporting body bores in the supporting body lead to the cooling oil grooves on the external grinding surfaces, there is ensured a specially reliable charge of the cooling oil grooves with cooling oil. Depending on the speed of the grinding disc, the cooling oil, as result of the centrifugal force, is pressed from the oil supply system into the bores that lead to the grinding surface, there being thus achieved a speed- or power-dependent supply with cooling oil of the external cooling oil grooves.

By varying both the radial and the axial arrangement of these bores, the degree of effectiveness of the cooling can be changed and the critical sites are supplied with cooling oil as intended.

According to another advantageous embodiment of the invention, the cooling oil supply lines discharge in the covering hood at both sides of the pot-shaped border in the sense of rotation of the grinding disc before the working area, approximately tangentially to the sense of rotation, so that the transfer of the cooling oil to the working area is aided by the rotation of the grinding disc and there results a turbulence-free wetting of the grinding surface with cooling oil.

Two embodiments of the invention will now be described, by way of example, with reference to the accompanying drawings, in which:

FIG. 1 is a section through a grinding disc corresponding to line I—I in FIG. 2;

FIG. 2 is a top view of the grinding disc;

FIG. 3 is a second embodiment of the instant invention; and

FIG. 4 is a top view of the second embodiment.

FIG. 1: The grinding disc contains a pot-shaped supporting body 3 which is carried by a drive shaft 2. The pot-shaped border of the supporting body 3 is roof-shaped and internally and externally coated with grinding material such as boron nitride. On this coated pot-shaped border 5, there are situated cooling oil grooves 7 that interrupt the grinding coat. The layers of grinding material extent forming acute angles with each other and are distributed in the grinding surfaces 6 between the cooling oil grooves 7 that extend inclines (spatially) toward the sense of rotation 14 of the grinding disc.

A hold-back room for oil is defined between the pot-shaped supporting body 3 and a covering hood 11 that is adapted to the contour of the supporting body and closely covers it except for a recess in the working area 12 of the grinding surface, whereby cooling oil is reliably prevented from being centrifuged by the grinding surfaces 6 prior to reaching the working area 12 of the grinding disc.

Beneath the roof-shaped border 5 is an oil collector 10 connected via bores 9 in the supporting body 3 with the cooling oil grooves 7 on the external grinding surface 6. These borings 9 can extend radially inclined toward the rotation axis 15 of the supporting body. In the sense of rotation of the grinding disc, before the working area 12, two cooling oil supply lines 13 enter into the covering hood at both sides of the pot-shaped border approximately tangential to the sense of rotation 14 (see FIG. 2).

Referring now to FIGS. 3 and 4, the grinding disc contains a disc-shaped supporting body 3 driven by a drive shaft 2. The disc's border 5 of the supporting body 3 has a peripheral profile and is coated with grinding material such as cubic boron nitride. On said coated disc's border 5 are placed cooling oil grooves 7 that interrupt the grinding coat. The layers of grinding material extend forming acute angles with each other and are defined in the grinding surfaces 6 by cooling oil grooves 7 that extend inclined toward the sense of rotation 14 of the grinding disc.

The disc-shaped supporting body 3 is fully covered by a covering hood 11 that is closely adapted to the contour of the supporting body 3 except for a recess in the working area 12 of the grinding disc. The covering hood 11 prevents that the cooling oil be centrifuged away prior to reaching the working area 12.

The cooling oil grooves 7 are connected, via the bores 9 in the supporting body 3 and a cooling oil supply line 13 in the drive shaft 2, with a cooling oil supply system (not shown).

DESCRIPTION OF THE OPERATION

The cooling oil supply lines 13 are either directly connected with the bores 9 in the supporting body 3 of the grinding disc or inject the cooling oil between the covering hood and the grinding disc from where it first reaches into an oil collector 10 and from there into the bores 9 in the supporting body 3. The bores 9 are situated in the supporting body 3 in a manner such that the centrifugal force resulting when the grinding disc rotation conveys the cooling oil through the bores 9. The bores 9 discharge in cooling oil grooves 7 in which the cooling oil is further transported and wets the adjacent grinding surfaces 6. By the covering hood 11 the cooling oil is retained on the grinding surface 6 and prevented from centrifuging away prior to reaching the working area 12 of the grinding disc.

By the arrangement of the cooling oil grooves 7 across the sense of rotation 14 of the grinding disc and the curved and spiral shaping within the grinding surfaces 6, the wetting of the grinding surfaces 6 in the working area 12 is designed to favor effectiveness, and by the bores 9 there is obtained an additional cooling within the grinding disc and the supply of the cooling oil grooves 7 with coolant is ensured. The inclination toward the sense of rotation 14 and the width of the cooling oil grooves 7 can here be varied according to the degree of cooling and grinding efficiency desired.

The segment left blank by the covering hood on the grinding surface as working area 12 should not be larger than 90° and preferably only the grinding surface should be left blank.

The mode of operation of the above arrangement is advantageously possible with only one cooling oil supply line 13 or with more than two cooling supply lines 13.

| | LIST OF RFFERENCE NUMBERS |
|---|---|
| 1 | work table |
| 2 | drive shaft |
| 3 | supporting body |
| 4 | pot-shaped bottom |
| 5 | disc's border |
| 6 | grinding surface |
| 7 | cooling oil groove |

| | -continued |
|---|---|
| | LIST OF RFFERENCE NUMBERS |
| 8 | hold-back room for oil |
| 9 | boring |
| 10 | oil collector |
| 11 | covering hood |
| 12 | working area |
| 13 | cooling oil supply line |
| 14 | sense of rotation |
| 15 | rotation axis |

I claim:

1. A grinding device including a rotating grinding disc comprising a supporting body having grinding surfaces (6), coated with an abrasive material, which are interrupted by cooling oil grooves (7) extending across the direction of rotation, said supporting body having bores extending from the axis of rotation toward the periphery of said grinding disc, said bores providing cooling oil to said cooling oil grooves when desired, characterized in that a covering hood (11) surrounds and closely covers all of the grinding disc except for a working area (12) of the grinding surfaces (6) and said cooling oil grooves (7) extend completely across the working surfaces (6), whereby said covering hood (11) retains the cooling oil on said grinding surfaces (6) and prevents the cooling oil from being centrifuged therefrom prior to reaching the working area (12) of the grinding disc.

2. A grinding device according to claim 1, wherein said abrasive material is cubic boron nitride.

3. A grinding device according to claim 1, wherein said grinding disc is circular and said working area is not greater than a 90 degree arc of the grinding disc.

4. A grinding device according to claim 1, wherein said support body is supported and driven by a drive shaft (2) provided internally with a cooling oil supply line (13) for supplying cooling oil to said bores.

5. A grinding device according to claim 1, wherein at least two cooling oil supply lines (13) are provided in the covering hood (11) for supplying cooling oil approximately tangential to the direction of rotation (14) of the disc, and said supporting body carries an oil collector (10) for providing cooling oil to said bores.

6. A grinding device according to claim 6, wherein said supporting body (3) forms, with said covering hood (11), an oil collector chamber (10) from which bores (9) lead to said cooling oil grooves (7) on the external grinding surface (6).

7. A grinding device according to claim 6, wherein cooling oil supply lines (13) discharge, before said working area (12) in the direction of rotation of said grinding disc in a covering hood (11) approximately tangentially at both sides of a border portion (5).

* * * * *